(12) United States Patent
Cerruti et al.

(10) Patent No.: US 8,280,043 B2
(45) Date of Patent: *Oct. 2, 2012

(54) SYSTEM AND METHOD FOR PROTECTING DATA IN A SECURE SYSTEM

(75) Inventors: Julian A. Cerruti, San Jose, CA (US); Sigfredo I Nin, Morgan Hill, CA (US); Dulce B Ponceleon, Palo Alto, CA (US); Vladimir Zbarsky, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 1154 days.

This patent is subject to a terminal disclaimer.

(21) Appl. No.: 12/133,658

(22) Filed: Jun. 5, 2008

(65) Prior Publication Data

US 2009/0323970 A1 Dec. 31, 2009

Related U.S. Application Data (63) Continuation of application No. 11/555,605, filed on Nov. 1, 2006, now Pat. No. 7,860,246.

(51) Int. Cl.
*H04L 9/00* (2006.01)
*H04N 7/167* (2011.01)

(52) U.S. Cl. ............ 380/42; 380/259; 380/260; 380/239

(58) Field of Classification Search .................. 380/281, 380/42, 239, 259, 260
See application file for complete search history.

(56) References Cited

U.S. PATENT DOCUMENTS

| | | | |
|---|---|---|---|
| 5,265,164 A | 11/1993 | Matyas et al. | |
| 6,084,968 A | 7/2000 | Kennedy et al. | |
| 6,118,874 A | 9/2000 | Okamoto et al. | |
| 6,134,660 A | 10/2000 | Boneh et al. | |
| 6,662,299 B1 * | 12/2003 | Price, III | 713/171 |
| 6,684,330 B1 | 1/2004 | Wack et al. | |
| 6,697,489 B1 | 2/2004 | Candelore | |
| 6,748,084 B1 * | 6/2004 | Gau et al. | 380/286 |
| 6,816,970 B2 | 11/2004 | Morgan et al. | |

(Continued)

FOREIGN PATENT DOCUMENTS

WO WO 03032133 A 4/2003

OTHER PUBLICATIONS

International Search Report Jan. 24, 2008.

(Continued)

*Primary Examiner* — Mohammad W Reza
(74) *Attorney, Agent, or Firm* — Shimokaji & Assoc., PC (57) ABSTRACT

A system for protecting data in a security system generates and encodes a backup key for encoding long-lived secrets. The system generates a distribution plan for distributing cryptographic splits of the encoded backup key to selected persons based on geographic and organizational diversity. The distribution plan specifies a number M of the cryptographic splits to be generated and a number N of the cryptographic splits required to recover the backup key. The system processes utilize an init file comprising system parameters and state files each comprising parameters reflecting a state of the secure system after a transaction. Any of the state files may be used for any of the system processes. The state files and the init file are encoded by the backup key, thus protecting the long-lived secrets.

18 Claims, 9 Drawing Sheets

U.S. PATENT DOCUMENTS

| | | |
|---|---|---|
| 7,836,515 B1 * | 11/2010 | Woodward ........................ 726/31 |
| 2002/0038296 A1 | 3/2002 | Margolus et al. |
| 2002/0071566 A1 | 6/2002 | Kurn |
| 2002/0108048 A1 | 8/2002 | Qi et al. |
| 2002/0152392 A1 | 10/2002 | Hardy et al. |
| 2003/0101346 A1 | 5/2003 | Baron et al. |
| 2003/0204732 A1 | 10/2003 | Audebert et al. |
| 2005/0141706 A1 * | 6/2005 | Regli et al. ........................ 380/44 |
| 2007/0223706 A1 * | 9/2007 | Gantman et al. ............... 380/286 |

OTHER PUBLICATIONS

Office Action dated Apr. 14, 2010 from U.S. Appl. No. 11/555,605.

Shamir, A., "How to Share a Secret," Communications of the ACM, vol. 22, No. 11, Nov. 1979, pp. 612-613.

\* cited by examiner

SYSTEM AND METHOD FOR PROTECTING DATA IN A SECURE SYSTEM

FIELD OF THE INVENTION

The present invention generally relates to protection of long-lived secrets such as encryption keys. More particularly, the present invention pertains to protecting a system that manipulates long-lived secrets in operations such as data protection, initialization, persistence, backup, and restore.

BACKGROUND OF THE INVENTION

The entertainment industry is in the midst of a digital revolution. Music, television, and movies are increasingly becoming digital, offering new advantages to the consumer in quality and flexibility. At the same time, since digital data can be perfectly and quickly copied, the digital revolution also comprises a threat. If consumers may freely copy entertainment content and offer that content on the Internet, the market for entertainment content would evaporate.

To solve this problem, several content protection schemes have been devised and are in wide use in the market. For example, DVD video is protected by the Content Scrambling System (CSS), DVD audio is protected by Content Protection for Pre-recorded Media (CPPM), digital video and audio recorders are protected by Content Protection for Recordable Media (CPRM), and digital busses are protected by Digital Transmission Content Protection (DTCP). All these schemes are based on encryption of the content. The device manufacturer is given cryptographic keys to decrypt the content, and in return is obligated by the license to follow a set of rules limiting the physical copies that can be made from a single piece of content.

The cryptographic keys required to encrypt and decrypt the content are distributed from a key generation facility to various entities involved in the content distribution network: content creators, media duplication facilities, devices for playing content, content distribution facilities, etc. Maintaining the secrecy of the cryptographic keys is essential for maintaining the integrity of a secure content protection scheme. The consequences of accidental or malicious disclosure of the long-lived secret keys are grave; loss of these secrets can lead total breakdown of the copy protection schemes the secrets support, and ultimately, to huge monetary loss for the participants of the copy protection scheme.

One conventional key generation facility secures the long-lived secrets by saving system secrets directly in cryptographic splits of the key (interchangeably referenced herein as key splits or splits) that are distributed to authorized persons (clients or client applications). The most sensitive system secrets reside in a secure cryptographic subsystem during operation, and are not otherwise externalized. The secure cryptographic subsystem comprises a separate computer.

Although this technology has proven to be useful, it would be desirable to present additional improvements. This conventional approach allows the system operator (e.g., Key Generating Facility, KGF) the ability to routinely restore the system from key splits; consequently, a single person can recover the long-lived secrets. The system state is saved unencrypted, part in a database, part in a set of files. The system saves its state after each transaction, and can be restored to any saved state. Backup comprises copying saved state to external media.

This conventional approach relies on the integrity of a single person, the system operator, to maintain the integrity of the secret keys and thus the key generation facility. The system operators by themselves have the ability to restore the secrets not just on that system but anywhere else. Consequently, this conventional approach put a burden of security and a liability on the operator to maintain integrity of the system.

Another conventional key generation facility saves in a database the encrypted system secrets and an encrypted state of the system after issuing a set of keys. Backup is performed by backing up the database. Rollback can only be performed by restoring the database to a previously saved backup state, and only the most recent state is saved. Enabling rollback to any transaction requires that the entire database be backed up after every transaction. The key used to encrypt the secrets and the state is saved as key splits that are distributed to authorized persons. A secure cryptographic subsystem is used to protect the key during normal operation.

Although this technology has proven to be useful, it would be desirable to present additional improvements.

For additional security, a system is desired that stores each state of the system after a set of keys is issued. For additional flexibility, the system can then be rolled back to any previously saved state. What is therefore needed is a system, a computer program product, and an associated method for protecting data in a security system. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for protecting data in a security system.

The present system generates and encodes a backup key which is to be used for protecting long-lived secrets with encryption. The present system generates a distribution plan for distributing cryptographic splits of the encoded backup key to selected persons. The distribution plan comprises geographic and organizational diversity to minimize a possibility of collusion between the persons to expose the backup key, to minimize the cost of bringing together a sufficient number of splits to recover the backup key, and to minimize the chance of losing too many splits in a regional disaster. The distribution plan further specifies a number M of the cryptographic splits to be generated and a number N of the cryptographic splits required to recover the backup key.

The present system generates the M number of the cryptographic splits and distributes the M number of the cryptographic splits according to the distribution plan.

The present system utilizes the backup key to protect the long-lived secrets in a secure storage and during system processes comprising an initialization process, a production process, a roll back process, a backup process, a restore process, and a backup key renewal process.

The system processes utilize an init file comprising system parameters and state files each comprising parameters reflecting a state of the secure system after a transaction. Any of the state files may be used for any of the system processes. The state files and the init file are encoded by the backup key, thus protecting the long-lived secrets.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Current state file: the most recently created state file or any state file designated as the current state file. The current state file is the file selected by the production module prior to performing a transaction. Only one state file is designated as the current file. When a new state file is generated, the current designation is removed from the current state file and applied to the new state file.

Init file: a file or document comprising system parameters used to execute a transaction or other function. System parameters of the init file are preferably constant and seldom changed. The following are exemplary init files and state files. Briefly, the NNL init file contains items such as: tree height, max subtree height (which determines how many keys a player must have), a root secret from which NNL keys are ultimately derived, the proportion of the tree devoted to software players, and the proportion devoted to hardware players; the Sequence Key init file contains items such as: key matrix dimensions, secret values from which keys are derived, and parameters that control the allocation of keys to licensees. Other init files contain the licensing authority's private keys for signing certificates and orders.

State file: a file or document comprising state parameters that represent a state of the system after a transaction is filled. State parameters change with each transaction. A set of state files provides a set of snapshots of the state of the system at transaction boundaries. Briefly, both state files contain a record of licensees registered in the system (numeric id), what portion of the total collection of keys are assigned to each licensee, which keys have been shipped to each licensee, which keys (if any) have been revoked, and numeric values needed to select the proper keys when filling an order for the licensee. Other state files contain the association between sequence keys and NNL keys for certain devices, and each licensee's current sequence number for signing content certificates.

Transaction: Process associated with fulfilling an order.

Figure 1:
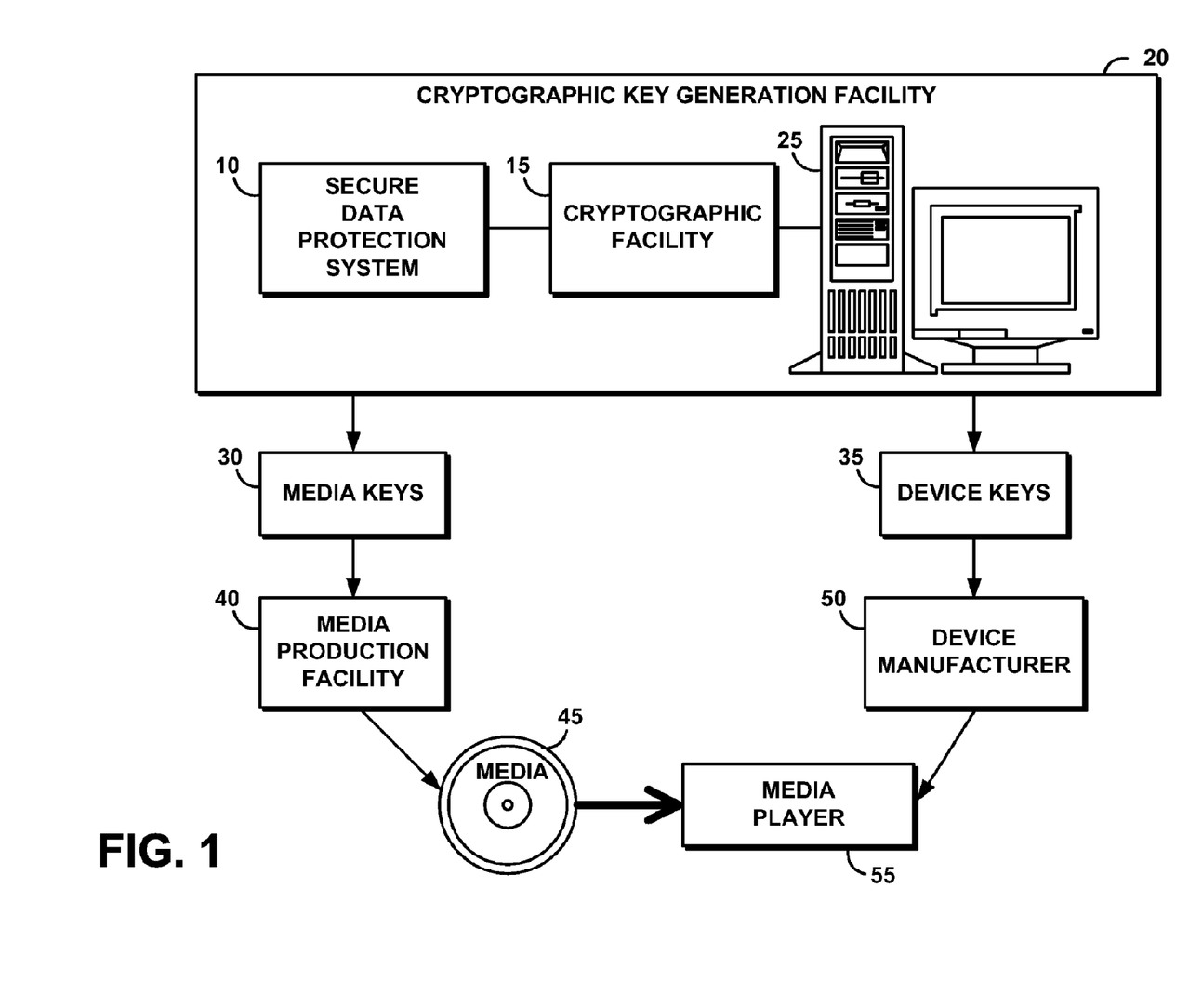
FIG. 1 is a schematic illustration of an exemplary operating environment in which a secure data protection system of the present invention can be used.

FIG. 1 portrays an exemplary overall environment in which a system, a computer program product, and an associated method (the secure protection system 10 or the "system 10") for protecting data in a secure system according to the present invention may be used. System 10 comprises a software programming code or a computer program product that is typically embedded within, or installed on a cryptographic facility 15. Alternatively, system 10 can be saved on a suitable storage medium such as a diskette, a CD, a hard drive, or like devices.

System 10 can take the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W) and DVD.

A data processing system suitable for storing and/or executing program code comprises at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A cryptographic key generation facility 20 comprises the cryptographic facility installed in a system such as a secure computer 25. The cryptographic key generation facility 20 produces cryptographic keys such as media keys 30 and device keys 35. The media keys 30 are provided to a media production facility 40. The media production facility 40 produces media such as a media 45 comprising content protected by one or more of the media keys 30 through encryption of the media keys 30.

The device keys 35 are provided to a device manufacturer 50. The device manufacturer 50 installs the device keys 35 in a media player 55. The media player 55 uses the device keys 35 to decrypt the protected content on media 45. Successful decryption of the media keys 30 on media 45 ensures that media 45 comprises an authorized copy of the content, enabling the media player 55 to play the content on media 45.

System 10 provides a secure repository of a long-lived secret between two or more security systems that are related and share long-lived secrets. While system 10 is described in terms of a content protection system, it should be clear that system 10 is applicable to additional systems requiring protection of long-lived secrets such as, for example, secure laptop applications, file backup servers, and web hosted applications, particularly if the applications handle very sensitive information.

In normal operation, system 10 saves a system state after each transaction. System 10 protects the cryptographic key generation facility 20 that uses sensitive, long-lived secrets such that the secrets are protected from disclosure and loss and any saved system state is protected from disclosure and loss. System 10 enables restoration of the cryptographic key generation facility 20 to any saved state. System 10 enables recovery of the secrets and the system state after a system failure; recovery requires the cooperation of several authorized persons. System 10 removes initialization and restoration functions from the production function, eliminating a possibility of disclosure or loss of the secrets by a system operator.

Figure 2:
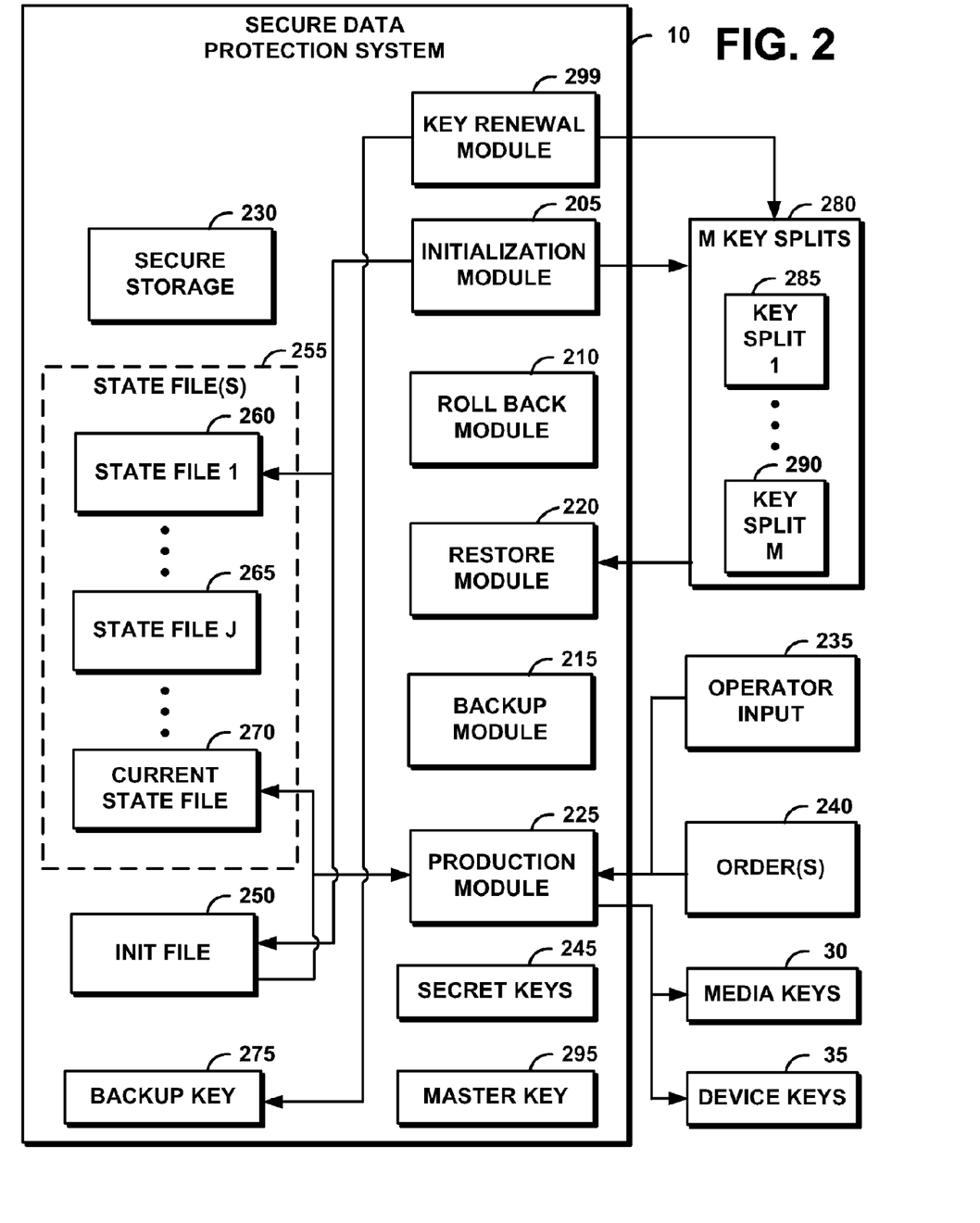
FIG. 2 is a block diagram of the high-level architecture of the secure data protection system of FIG. 1.

FIG. 2 illustrates a high-level hierarchy of system 10. System 10 comprises an initialization module 205, a roll back module 210, a backup module 215, a restore module 220, a production module 225, and secure storage 230. Inputs to system 10 comprise operator input 235 and orders 240 for media keys 30 and device keys 35. Output of system 10 comprises media keys 30 and device keys 35. The output of the system 10 is generated from a set of secret keys 245. Additional output of system 10 may comprise cryptographic certificates that authenticate content.

The initialization module 205 and the restore module 220 may be implemented with programs that can be run from removable media. The production module 225 may be implemented in a program that is permanently installed and processes the transactions of system 10. The backup module 215 can be implemented using an ordinary file backup utility or a manual procedure.

System 10 further comprises an init file 250 and one or more state files 255. The init file 250 comprises system parameters that are independent of a status of system 10 such as, for example, parameters that describe the number and values of the secret keys 245. The state files 255 comprise snapshots of a state of system 10 such as state file 1, 260, through state file J, 265, and a state file designated as a current state file 270. Each of the state files 255 reflects a boundary between transactions and comprises parameters that change with each transaction performed by system 10. The current state file 270 comprises parameters from the most recent transaction of system 10 such as, for example, the licensees registered in the system, which keys have been assigned to each licensee, and which keys have been revoked.

The initialization module 205 performs an initialization process to generate the secrets that system 10 uses during normal operation and to produce a snapshot of the initial state of system 10. The initialization module 205 produces the init file 250. The init file 250 is a collection of protected files containing secrets and parameters of system 10.

The initialization module 205 produces an initial state file stored as the current state file 270. The initial state file comprises an initial snapshot of the state of system 10 encrypted with the backup key 275. The backup key 275 is installed in the cryptographic facility 15. The backup key 275 is used to protect files containing the system secrets, parameters, and state. The backup key 275 is used indirectly to encrypt a randomly selected session key. The session key is used to encrypt the contents of the init file 250 and the state files 255. After initialization, the backup key 275 resides in the secure storage 230.

The backup key 275 is further exported as a set of M key splits 280, as explained for example, in Adi Shamir, "How to Share a Secret," ACM 1979, pages 612-613. The M key splits 280 comprise key split 1, 285, through key split M, 290, written to some form of external media. The M key splits 280 are distributed to officials or entities responsible for system 10. To restore the backup key 275 and thus be able to read the init file 250 and state files 255, N of the M key splits 280 are required (e.g., 4 of 7, or 3 of 11 key splits). Any N of the M key splits 280 are sufficient.

The M key splits 280 are distributed among several people or entities, so a minimum of N people must collude to expose the secret backup key. These people are selected from geographically diverse locations within, for example, a company or a group of companies (or entities) such that the key splits 280 are also geographically distributed. This geographic diversification makes it is unlikely that a disaster leaves fewer than N shares intact and further reduces the possibility of collusion.

In one embodiment, system 10 stores the backup key 275 in secure key storage on disk encrypted by a master key 295 and loads the backup key 275 when the backup key 275 is required for processing. The initialization module 205 as part of the initialization process generates the master key 295. The initialization module 205 generates the backup key 275 and installs the backup key 275 in system 10.

In another embodiment, system 10 uses custom extension software to generate the backup key 275 and the M key splits 280 on-board the cryptographic facility 15. The custom extensions further enable the cryptographic facility 15 to reconstruct the backup key 275 from N of the M key splits 280. In this embodiment, the backup key 275 is never exposed in the clear outside the highly secure environment of the cryptographic facility 15.

The production module 225 runs repeatedly to process transactions based on orders 240. After each transaction, system 10 stores a snapshot of the system state in the state files 255, protected with the backup key 275. When the production module 225 is loaded, it normally restores its state from the most recent snapshot, the current state file 270. The production module 225 uses the backup key 275 to encrypt and decrypt the state files 255.

In one embodiment, when the production module 225 is started, the cryptographic facility 15 loads the backup key 275 from secure storage 230. Decryption and encryption of secured data is performed within the secure environment of the cryptographic facility 15.

The production process can be started with the system state restored from any state file in the state files 255. If it is necessary to negate the effect of a transaction, production module 225 is loaded using a state file immediately preceding the current state file 270.

The backup module 215 runs periodically to save the system secrets in the form of the init file 250 and the state files 255 to offline media. The backup module 215 needs only to copy the init file 250 and the state files 255. The backup module 215 does not have to process the init file 250 or the state files 255. The encryption ensures that the init file 250 and the state files 255 remain protected. The backup process of the backup module 215 may be implemented with the system copy command (run manually or using a simple script or batch program) or with a commercial backup utility.

The restore module 220 is run as necessary to restore system 10 after a crash or onto new hardware. The restore module 220 copies the init file 250 and one or more of the state files 255 comprising at minimum the current state file 270 to their proper location in the file system of system 10. The restore module 220 restores the backup key 275 from N of the M key splits 280 and re-initializes system 10 with the backup key 275.

The backup key 275 may be renewed from time to time. Renewing of the backup key 275 is implemented by re-encrypting the init file 250 and the current state file 270 with the new backup key and saving the old backup key encrypted with the new backup key. The old backup key enables access to older snapshots in the state files 255.

In one embodiment, a database is used to store the secrets, parameters of the init file 250 and the parameters of the state files 255.

System 10 comprises the master key 295 and the backup key 275. In one embodiment, the master key is a cleartext key contained inside the secure facility 15. In another embodiment, the master key is a triple DES (DES-EDE) 168-bit key comprising three randomly generated unique 56-bit DES keys. The master key 295 exists only inside the secure facility 15 and does not require replication.

The master key 295 is only used to encipher single-length and double-length DES keys (and also RSA keys) stored in secure key storage in the secure storage 230. The master key 295 is not used for encryption/decryption of data.

In one embodiment, the backup key 275 is a double-length DES key comprising two randomly generated unique 56-bit DES keys and is used in DES-EDE encryption mode. Encryption of data in DES-EDE mode under two halves $k_1$ and $k_2$ of the backup key is defined as DES-E($k_1$,DES-D($k_2$,DES-E($k_1$, data))). Using only a double-length key with DES-EDE in this way is no weaker than using three unique DES keys with DES-EDE, because due to meet-in-the-middle attack DES-EDE with three unique keys effectively provides 112 bits of key security.

The backup key 275 is stored in secure storage 230, enciphered under the master key 295. At runtime, the backup key 275 is loaded into the production module 225, and encryption/decryption of data via the backup key 275 occurs inside system 10 in the secure cryptographic facility 15.

State snapshots of the cryptographic facility 15 are stored as the state files 255 on the secure storage 230 protected by the backup key 275. The state files 255 are further backed up to secondary/tertiary storage and protected in storage by the backup key 275. Each of the state files 255 is a subdirectory with files, each file representing the state of individual components of long-lived secrets such as, for example, NNL keys, sequence keys, a content signing root key, a facility root key, etc. The facility root key and content signing root keys are authentication keys used to authenticate the output of system 10.

For each device key order, a selection of the NNL keys and a selection of the sequence keys are output as device keys. For each media order, a randomly selected "media key" is output together with their encryption (in an MKB—media key block) by a selection of the NNL keys, and a set of randomly generated "media key variants" is output together with their encryption (in an SKB—sequence key block) by a selection of the sequence keys. Briefly, for a media order, a selection of randomly generated media keys is output, encrypted with a selection of the NNL keys and sequence keys.

Each of the state files 255 begin with a 128 bit randomly generated AES session key, encrypted via backup key by DES-EDE with CBC chaining mode and no padding. The remainder of the state file 255 is encrypted via the session key by AES with CBC chaining mode and PKCS5 padding, and comprises consecutively 16 random bytes, the state of the secure facility 15, and the SHA-160 hash of the state of the secure facility 15. The 16 random bytes represent the initial text sequence block; they are used to modify an initial block of state data prior to encryption in lieu of an initialization vector.

Figure 3:
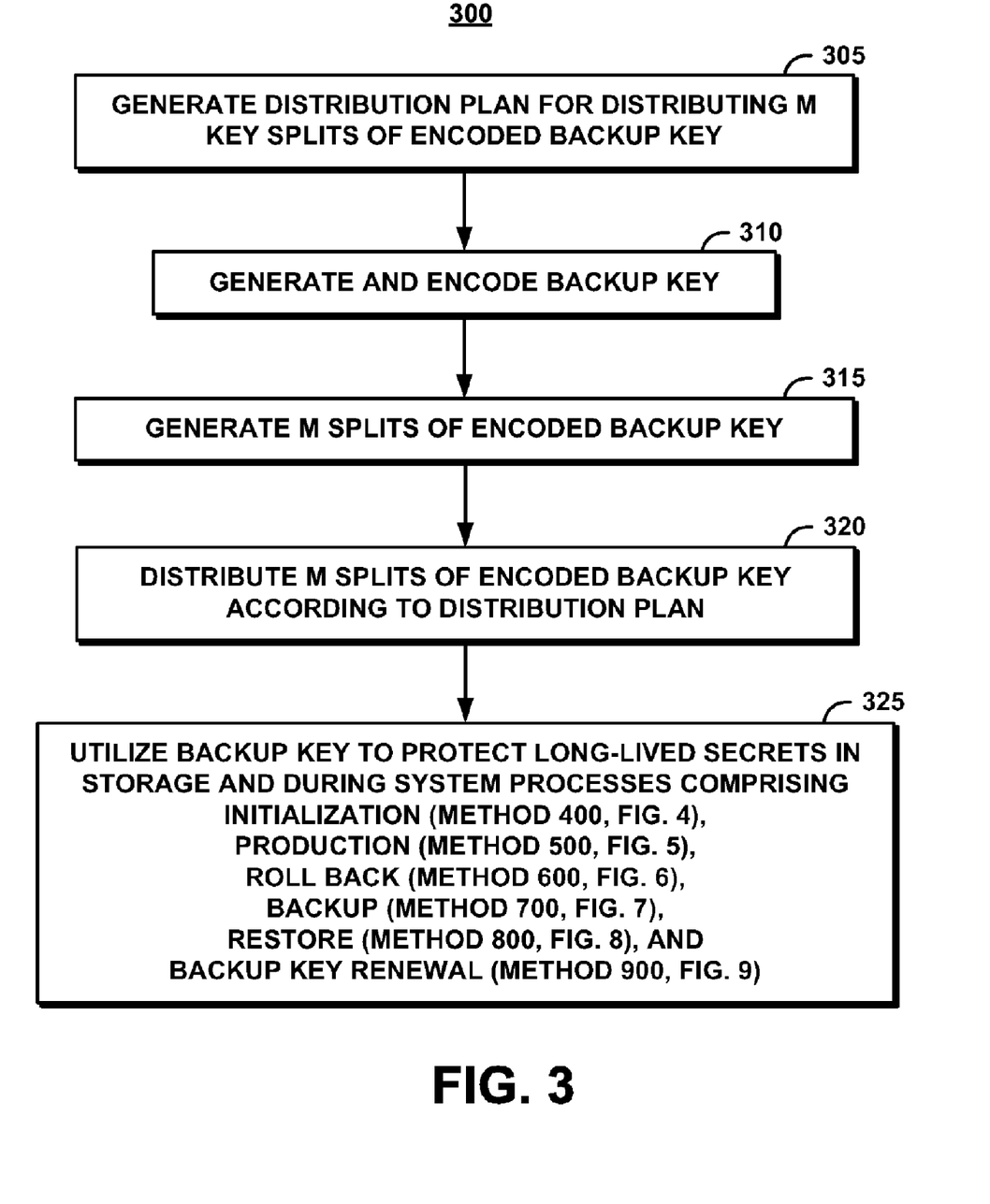
FIG. 3 is a process flow chart illustrating a method of operation of the secure data protection system of FIGS. 1 and 2 in protecting long-lived secrets.

FIG. 3 illustrates a method 300 of system 10 in protecting long-lived secrets. A distribution plan is generated for distributing the M key splits 280 of an encoded backup key 275 (step 305). The generated distribution plan comprises a number M of key splits that are generated and a selection of the persons or entities to which the key splits are entrusted. In one embodiment, M is seven with four key spits required to be present in order to restore the backup key 275.

The persons or entities are selected to maximize geographic diversity of the distribution plan without incurring undue hardship in gathering the selected persons or entities to restore the backup key 275, and to avoid loss of too many splits due, for example, to a regional disaster. The persons or entities are further selected to maximize organizational diversity to discourage the possibility of collusion between the selected persons or entities. The backup key 275 is distributed in 128 bit format to the selected persons or entities. The 128 bit format is due to each half of the backup key 275 being stored in 64 bit format=56 bits of key data+8 bits of parity information.

System 10 generates and encodes the backup key 275 (step 310). System 10 generates M key splits 280 of the encoded backup key 275 (step 315). The M key splits 280 of the encoded backup key 275 are distributed according to the distribution plan (step 320). During generation of the M key splits 280, an operator is prompted regarding where to save each split of the backup key 275. The operator saves each share to a different recordable such as, for example, a DVD, so that no storage medium ever contains more than one split.

System 10 uses the backup key 275 to protect long-lived secrets in storage and during processes of system 10 (step 325). The processes of system 10 comprise initialization (described by method 400 in FIG. 4, production (described by method 500 in FIG. 5), roll back (described by method 600 in FIG. 6), backup (described by method 700 in FIG. 7), restore (described by method 800 in FIG. 8), and backup key renewal (described by method 900 in FIG. 9).

The following table represents an exemplary distribution plan for the splits:

| | |
|---|---|
| Total No of key splits | 11 |
| No of key splits given to each official | 1 |
| No of key splits given to KGF | 3 |
| No of key splits needed to rebuild | 5 |
| No of officials needed to rebuild at KGF site | 2 |

Figure 4:
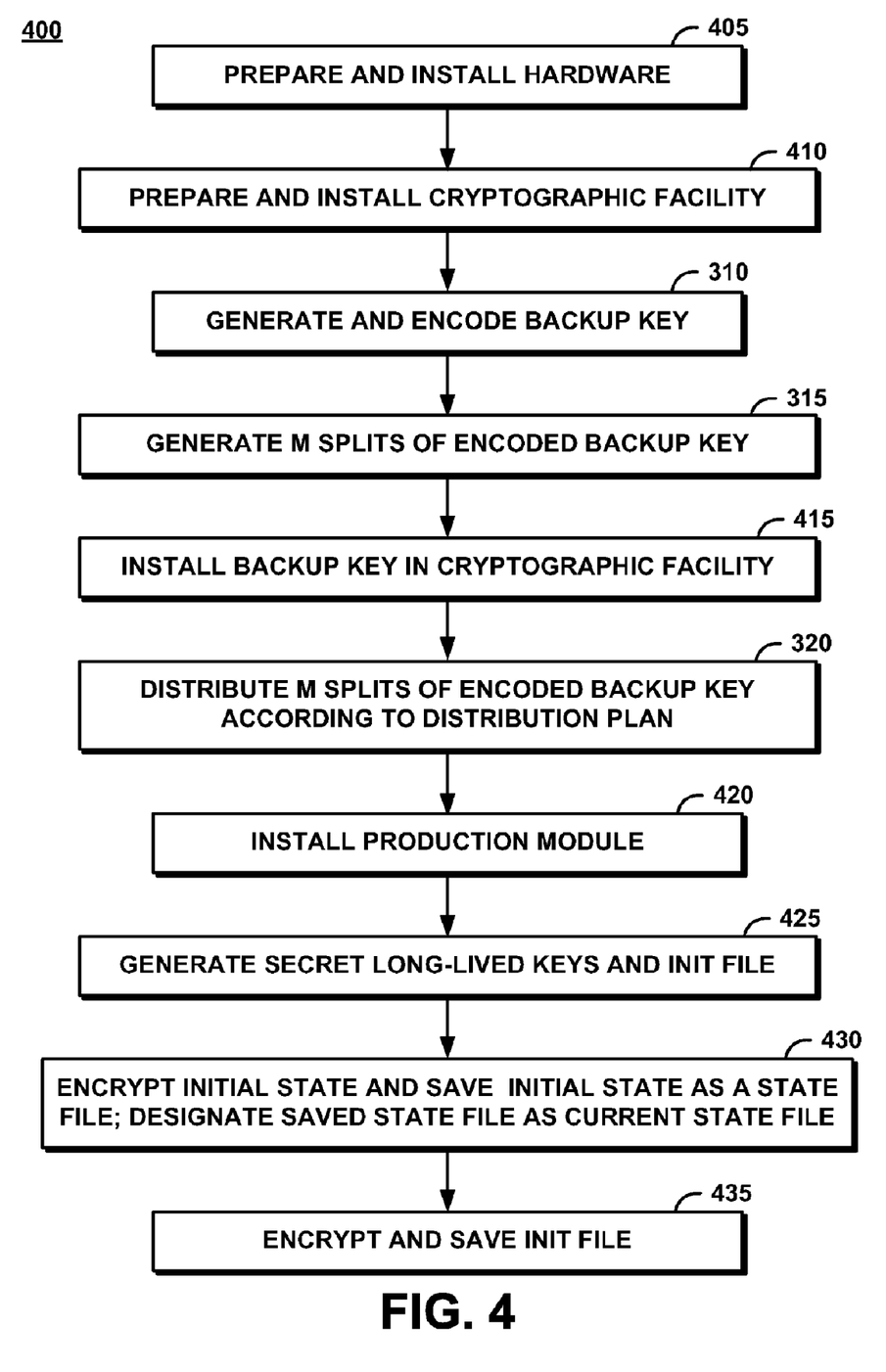
FIG. 4 is a process flow chart illustrating a method of operation of the secure data protection system of FIGS. 1 and 2 in an initialization process.

FIG. 4 illustrates a method 400 of system 10 in initializing system 10. Hardware is prepared and installed (step 405). Because the hardware is receiving and operating a secure cryptographic facility 15, preparation and installation of the hardware comprises opening every piece of hardware new and sealed to make sure that no Trojan horses exist in the hardware.

The cryptographic facility 15 is prepared and installed (step 410). The cryptographic facility 15 comprises the master key 295 and can perform desired cryptographic operations using the master key 295 without externalizing the master key 295.

The initialization module 205 generates and encodes the backup key 275 and generates M key splits 280 of the encoded backup key according to steps 310 and 315 of method 300 (FIG. 3). The initialization module 205 installs the backup key 275 in the cryptographic facility 15 (step 415). The M key splits 280 are distributed according to the distribution plan as described in step 320 of method 300 (FIG. 3).

The initialization module 205 could install the production module 225 in computer 25 (step 420). During production, the production module 225 will use the secure cryptographic facility (which now has the backup key installed) to decrypt the init and state files, and to encrypt the updated state file. The initialization module 205 generates secret long-lived keys and the init file 250 (step 425). The initialization module 205 encrypts an initial state of system 10 with the backup key, saves the initial state as a state file, and designates the saved state file as the current state file 270 (step 430). The initialization module 205 encrypts the init file with the backup key and saves the init file (step 435).

In one embodiment, the initialization module 205 comprises an initialization code operated from a removable media such as a CD. In this embodiment, the initialization module 205 is present only during initialization and is not available to operators to prevent re-initialization of the system and thus compromise of the long-lived secrets. The initialization module 205 is removed from the cryptographic facility 15 after the initialization process of method 400 is complete.

Figure 5:
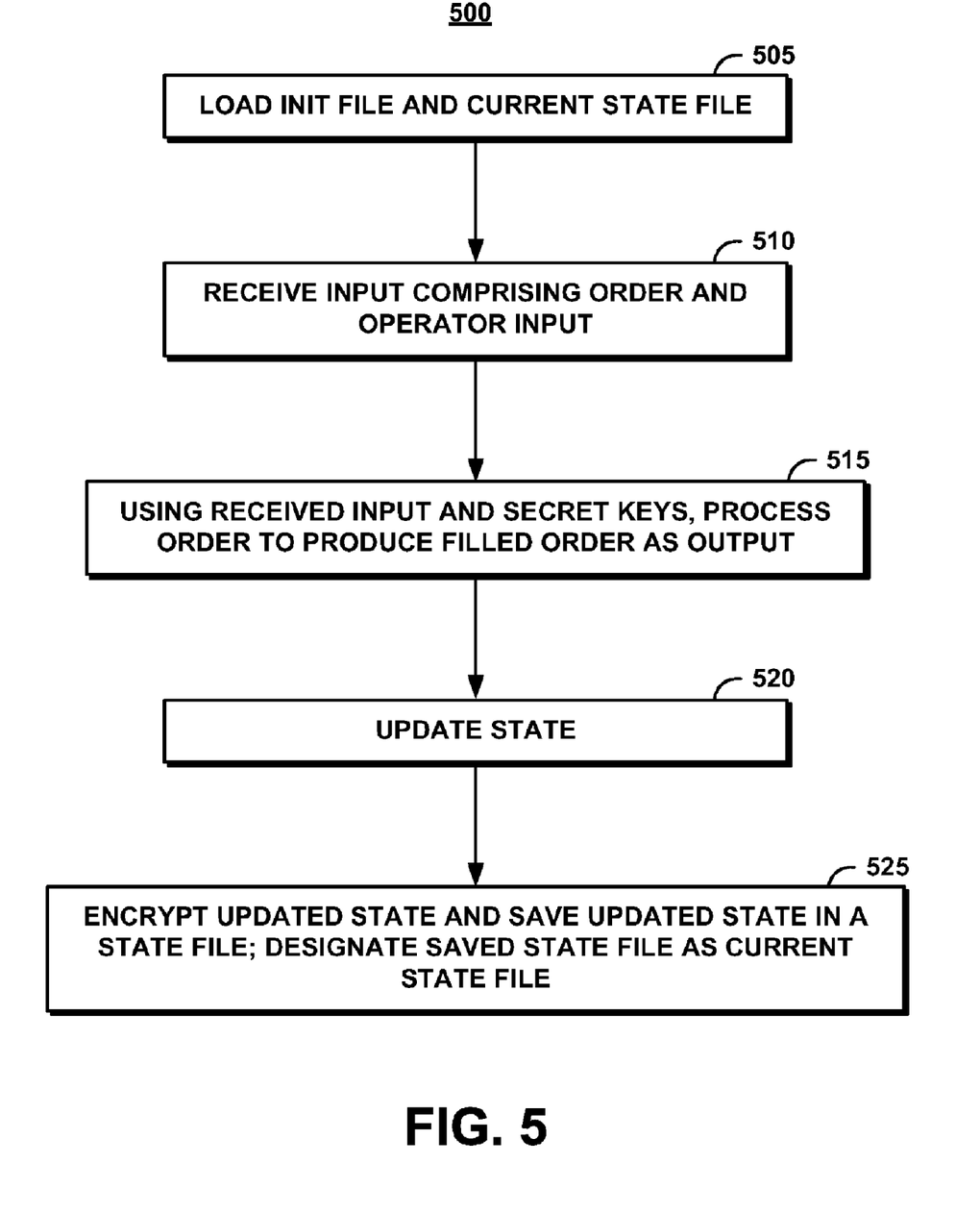
FIG. 5 is a process flow chart illustrating a method of operation of the secure data protection system of FIGS. 1 and 2 in a production process.

FIG. 5 illustrates a method 500 of system 10 in producing output such as the media keys 30 or the device keys 35. The production module 225 loads the init file 250 and the current state file 270 (step 505). The production module 225 receives input comprising the order 240 and the operator input 235 (step 510). The operator input 235 comprises operator instructions and additional input such as, for example, an unsigned content certificate, a licensee key, etc. The production module 225 uses the received input and the secret keys 245 to process order 240 and to produce a filled order as output (step 515). The filled order comprises, for example, media keys 30 or device keys 35.

The production module 225 updates the state of system 10 (step 520). The production module 225 encrypts the updated state with the backup key, saves the updated state in a state file, and designates the saved state file as the current state file 270 (step 525).

Figure 6:
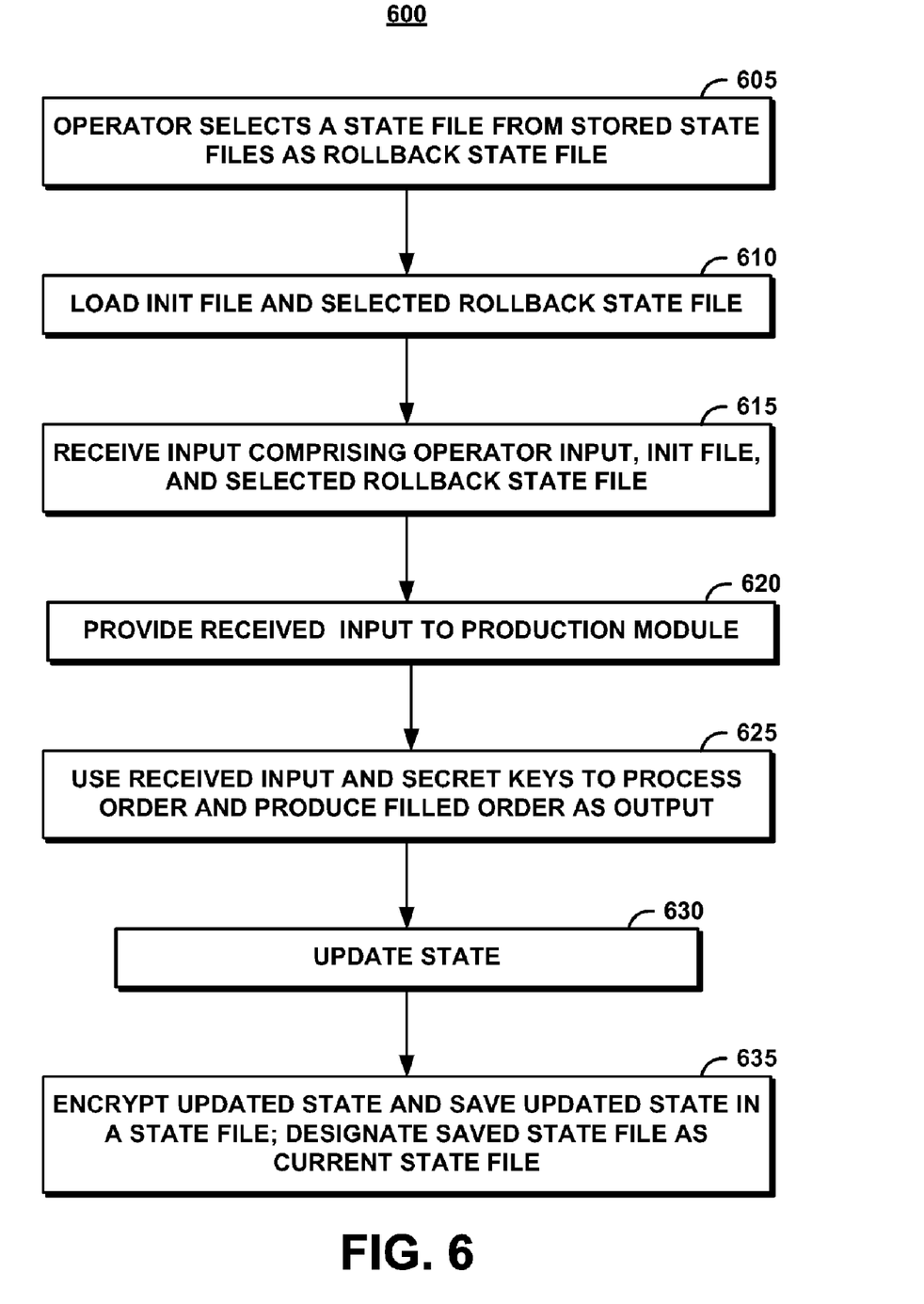
FIG. 6 is a process flow chart illustrating a method of operation of the secure data protection system of FIGS. 1 and 2 in a roll back process.

FIG. 6 illustrates a method 600 of system 10 in performing a roll back process. An operator selects a state file from one or more stored state files as a rollback state file (step 605). The operator loads the init file and the selected rollback state file (step 610). The roll back module 210 receives operator input 235, the loaded init file, and the selected rollback state file (step 615) and provides the received input, init file, and selected rollback state file to the production module 225 (step 620). The production module 225 uses the received input and the secret keys 245 to process an order to produce a filled order as output (step 625). The production module 225 updates the state of system 10 (step 630). The production module 225 encrypts the updated state with the backup key, saves the updated state in a state file, and designates the saved state file as the current state file 270 (step 635).

Figure 7:
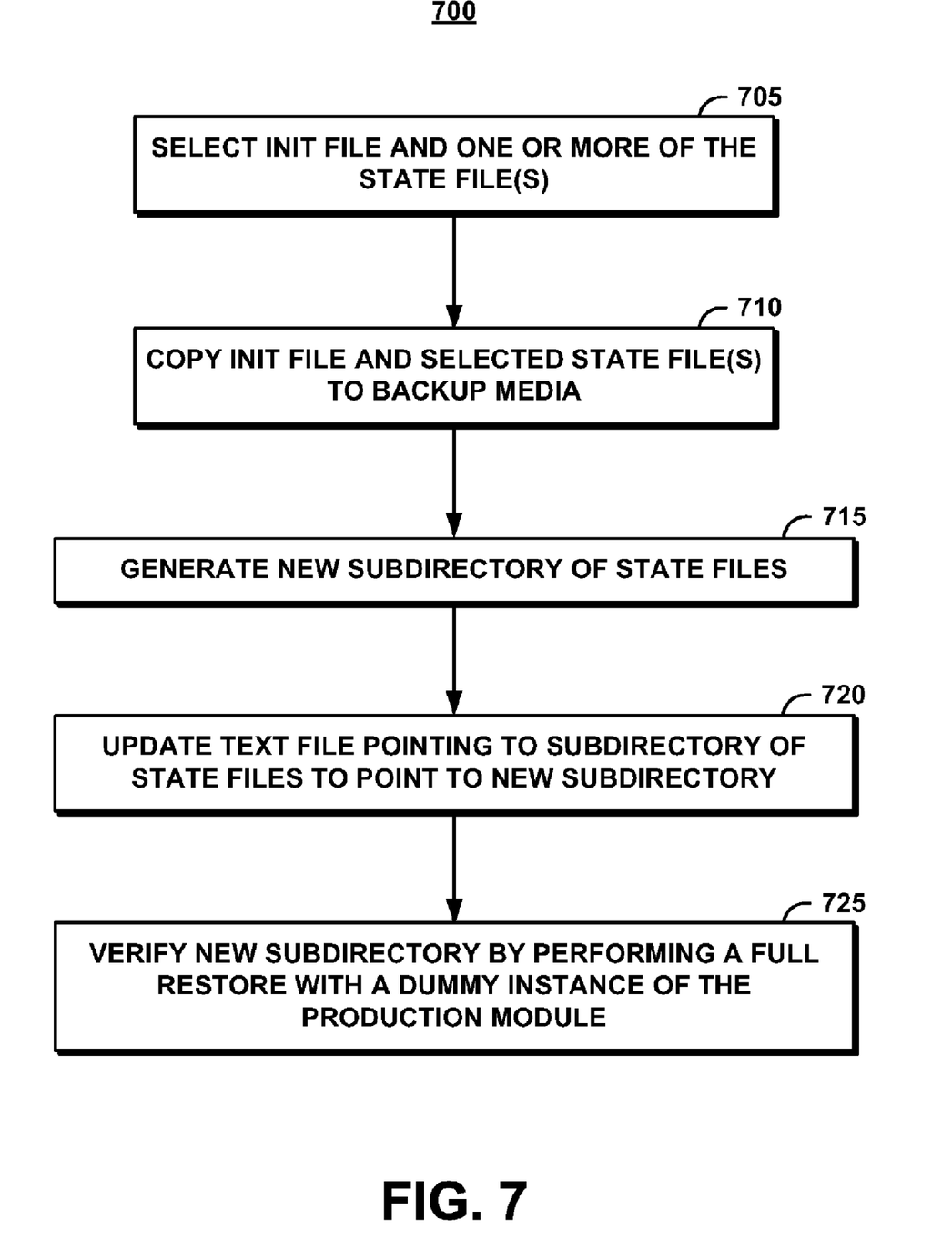
FIG. 7 is a process flow chart illustrating a method of operation of the secure data protection system of FIGS. 1 and 2 in a backup process.

FIG. 7 illustrates a method 700 of system 10 in generating a backup. The backup module 215 selects the init file 250 and one or more of the state files 255 (step 705). The backup module 215 copies the init file 250 and selected state files 255 to the backup media (step 710).

The backup module 215 generates a new subdirectory of the state files 255 (step 715). The backup module 215 updates the text file pointing to the subdirectory of the state files to point to the new subdirectory (step 720). The filename of each subdirectory of the state files 255 comprises date and time of creation. The backup module 215 verifies the new subdirectory by performing a full restore operation with a dummy instance of the production module (step 725).

Figure 8:
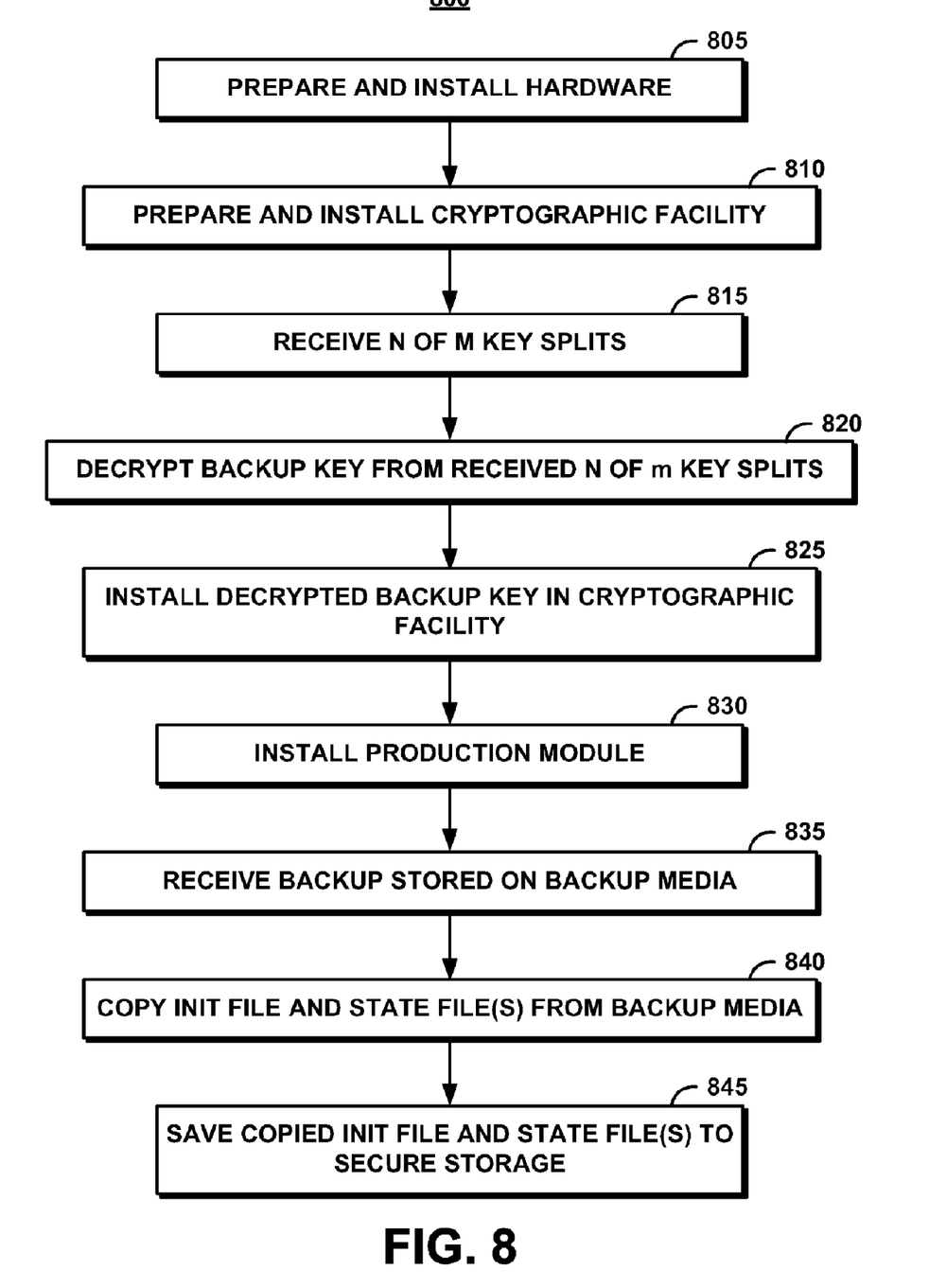
FIG. 8 is a process flow chart illustrating a method of operation of the secure data protection system of FIGS. 1 and 2 in a restore process.

FIG. 8 illustrates a method 800 of system 10 in restoring a copy of system 10 onto new hardware. New hardware is installed and prepared (step 805) as described previously in step 410. The cryptographic facility 15 is prepared and installed as described previously in step 415 (step 810). System 10 receives at least N of the M key splits 280 (step 815). The restore module 220 decrypts the backup key 275 from the received N of M key splits 280 (step 820).

The restore module 220 installs the decrypted backup key 275 in the cryptographic facility 15 (step 825). The restore module 220 installs the production module 225 (step 830). The restore module 220 receives a backup stored on backup media (step 835). The restore module 220 copies the init file 250 and the state files 255 from the backup media (step 840). The restore module 220 saves the copied init file 250 and state files 255 onto secure storage 230 (step 845).

Figure 9:
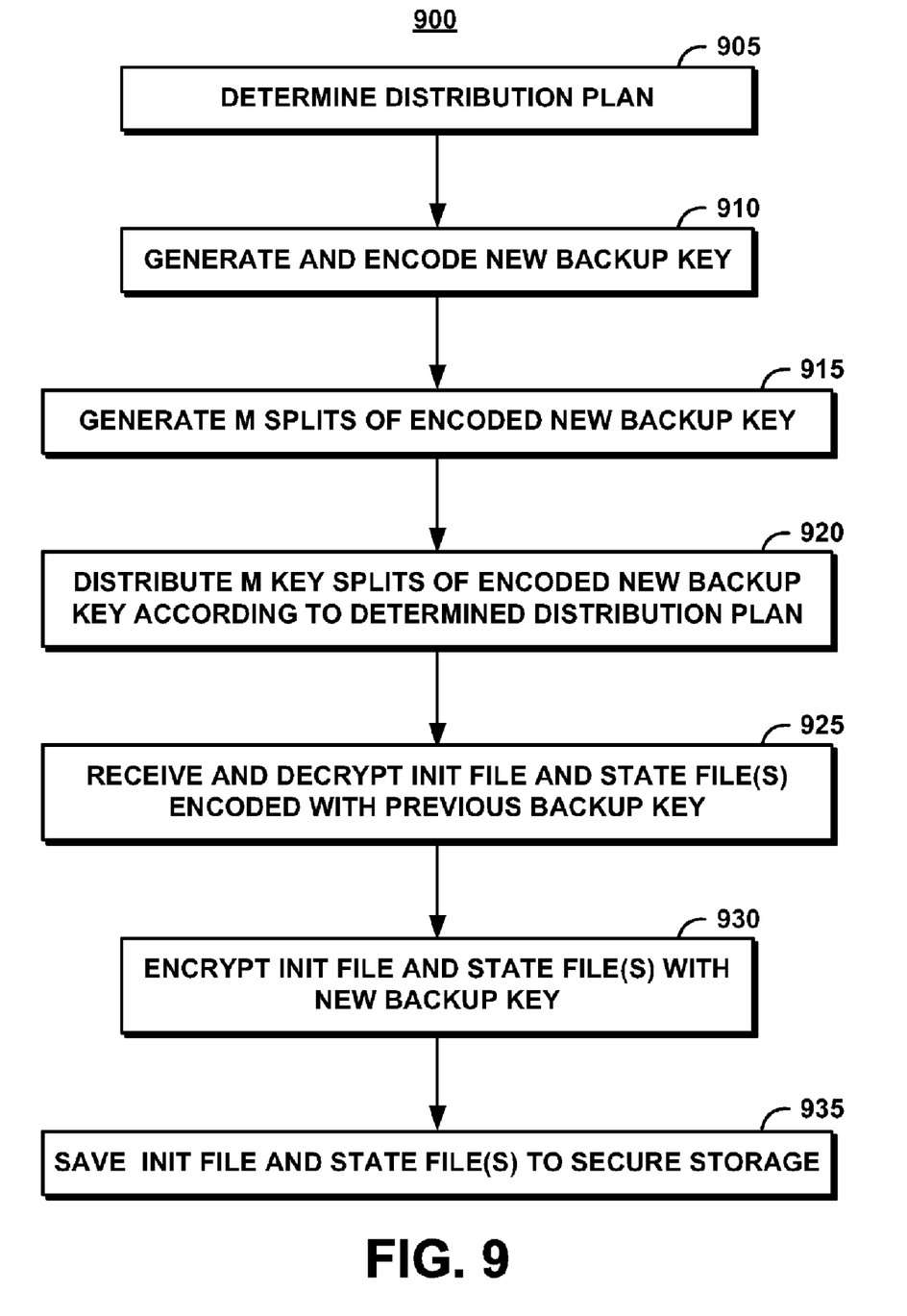
FIG. 9 is a process flow chart illustrating a method of operation of the secure data protection system of FIGS. 1 and 2 in a backup key renewal process.

FIG. 9 illustrates a method 900 of system 10 in generating a new backup key 275. A new backup key 275 may be required if, for example, collusion is suspected in an attempt to discover the backup key 275 or a new distribution plan is required for distribution of the M key splits 280. The distribution plan of the M key splits 280 is determined (step 905) by selecting the previous distribution plan or generating a new distribution plan. In the case of suspected collusion, a new distribution plan is selected that omits persons suspected of collusion. Otherwise, a new distribution plan may be generated that replaces persons that are no longer with the company, etc. Similarly to the initialization and restore modules, the backup key renewal module 299 might not be available on the production system. It can, for example, only be used in the context of a "ceremony" which requires the presence of some minimum number of responsible officials to act as witnesses.

The restore module 220 generates and encodes a new backup key (step 910) to function as backup key 275. The restore module 220 generates M key splits 280 of the encoded new backup key (step 915). The M key splits 280 of the encoded new backup key are distributed according to the determined distribution plan (step 920).

The restore module 220 receives and decrypts the init file 250 and the state files 255 that were encoded with the previous backup key (step 925). The restore module 220 encrypts the init file 250 and the state files 255 with the new backup key (step 930). The restore module 220 saves the init file 250 and the state files 255 to secure storage 230 (step 935).

The init file 250 typically does not change from transaction to transaction of system 10. However, contents of the init file 250 may be changed if desired. To change the contents of the init file 250, operator input 235 is provided to modify the init file 250. The init file 250 is updated and re-encrypted. The production module 225 uses the updated init file 250 for the next transaction.

According to another embodiment, it is conceivable to use more than one facility for the implementation of the present invention. As an example, when three facilities are used, additional splits are needed as compared to the single facility. In this illustration, at least 15 splits may be used in order for each facility (facilities are treated differently than officials) to have more than one split. Having, for example, a total of 15 splits with only 5 splits needed for rebuilding is a weaker scheme since it uses ⅓ of the total splits. However, there is no need to have a higher number of splits, instead it is possible to use as many sets of splits as facilities, such as:

Split_Set_1: a total of 11 splits where 3 splits are given to Facility_1

Split_Set_2: a total of 11 splits where 3 splits are given to Facility_2, etc.

The price of this scheme is that each official needs to have one split per facility. In the foregoing example, each official would have 2 splits (one for each facility) instead of a single split. As a result, it is not possible for any two facilities to collude in order to compromise the system since each facility has splits to completely different sets.

It is to be understood that the specific embodiments of the invention that have been described are merely illustrative of certain applications of the principle of the present invention. Numerous modifications may be made to the system and method for protecting data in a secure system described herein without departing from the spirit and scope of the present invention. Moreover, while the present invention is described for illustration purpose only in relation to a broadcast encryption system, it should be clear that the invention is applicable as well to, for example, any secure system in which long-lived secrets are maintained.

What is claimed is:

1. A processor-implemented method of protecting data in a secure system, comprising:
    generating a backup key;
    encrypting a plurality of secrets by the backup key;
    generating a distribution n plan for distributing a plurality of cryptographic splits of the backup key to a plurality of clients,
        wherein the distribution plan includes geographic and organizational diversity, and
        wherein the distribution plan specifies a first predetermined number, M, of the cryptographic splits to be generated and a second predetermined number, N, of the cryptographic splits required to recover the backup key;
    generating the M number of the cryptographic splits;
    distributing the M number of the cryptographic splits according to the distribution plan;
    utilizing the backup key to protect the secrets during a plurality of system processes;
    utilizing an init file to store secrets that are not changed recurrently;
    generating a session key to encrypt the init file, wherein the session key is randomly generated;
    using the backup key to encrypt the session key;
    utilizing a state file to record parameters that can change with each transaction; and
    encoding the state file by the backup key.

2. The method of claim 1, further comprising encoding the init file by the backup key.

3. The method of claim 1, further comprising utilizing a state file to record parameters that can change with each transaction.

4. The method of claim 3, further comprising encoding the state file by the backup key.

5. The method of claim 1, further comprising an initialization module for generating the init file.

6. The method of claim 1, wherein utilizing the init file comprises a production module that uses the init file.

7. The method of claim 1, further comprising a backup module for saving the init file.

8. The method of claim 1, further comprising a restore module for restoring the init file and for recovering the backup key.

9. The method of claim 1, further comprising encrypting the init file and state file with a new backup key.

10. The method of claim 1, further comprising a roll back module for loading the init file and a selected rollback state file.

11. The method of claim 1, further comprising an initialization module for generating an initial state file.

12. The method of claim 1, further comprising a production module utilizing a current state file.

13. The method of claim 12, further comprising a backup module for saving the current state file.

14. The method of claim 11, further comprising a restore module for restoring the initial state file.

15. The method of claim 11, further comprising a roll back module for loading the initial state file and a selected rollback state file.

16. A processor-implemented system for protecting data in a secure system, comprising:
    an initialization module for encrypting a plurality of secrets by a backup key;
    the initialization module generating a distribution plan for distributing a plurality of cryptographic splits of the backup key to a plurality of clients;
    wherein the distribution plan includes geographic and organizational diversity;
    wherein the distribution plan specifies a first predetermined number, M, of the cryptographic splits to be generated and a second predetermined number, N, of the cryptographic splits required to recover the backup key;
    the initialization module generating the M number of the cryptographic splits;
    the initialization module distributing the M number of the cryptographic splits according to the distribution plan;
    a plurality of modules for utilizing the backup key to protect the secrets during a plurality of system processes; and
    a renewal module for periodically renewing the backup key by saving the backup key and generating a new backup key.

17. A computer program product having a plurality of instruction codes stored on a non-transitory computer usable storage medium, for protecting data in a secure system, the computer program product comprising:
    a set of instruction codes for encrypting a plurality of secrets by a backup key; and
    a set of instruction codes for generating a distribution plan for distributing a plurality of cryptographic splits of the backup key to a plurality of clients,
        wherein the distribution plan includes geographic and organizational diversity,
        and wherein the distribution plan specifies a first predetermined number, M, of the cryptographic splits to be generated and a second predetermined number, N, of the cryptographic splits required to recover the backup key;
    a set of instruction codes for generating the M number of the cryptographic splits;
    a set of instruction codes for distributing the M number of the cryptographic splits according to the distribution plan;

a set of instruction codes for utilizing the backup key to protect the secrets during a plurality of system processes;

a set of instruction codes for periodically renewing the backup key by saving the backup key and generating a new backup key;

a set of instruction codes for utilizing an init file to store secrets that are not changed recurrently; and a set of instruction codes for re-encrypting the init file with the new backup key.

18. A processor-implemented service method for protecting data in a secure system, comprising:

generating, by a physical processor, a backup key;

encrypting a plurality of secrets by the backup key;

generating a distribution plan for distributing a plurality of cryptographic splits of the backup key to a plurality of clients, wherein the distribution plan includes geographic and organizational diversity, and wherein the distribution plan specifies a first predetermined number, M, of the cryptographic splits to be generated and a second predetermined number, N, of the cryptographic splits required to recover the backup key;

generating the M number of the cryptographic splits;

distributing the M number of the cryptographic splits according to the distribution plan;

utilizing the backup key to protect the secrets during a plurality of system processes;

periodically renewing the backup key by saving the backup key as an old backup key and generating a new backup key; and accessing previous state information with the old backup key.

\* \* \* \* \*